United States Patent
Lu

(10) Patent No.: US 9,991,798 B2
(45) Date of Patent: Jun. 5, 2018

(54) CONSTANT ON-TIME CONTROL FOR POWER CONVERTER

(71) Applicant: TEXAS INSTRUMENTS INCORPORATED, Dallas, TX (US)

(72) Inventor: Bing Lu, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 793 days.

(21) Appl. No.: 14/179,792

(22) Filed: Feb. 13, 2014

(65) Prior Publication Data

US 2015/0229199 A1    Aug. 13, 2015

(51) Int. Cl.
*H02M 3/335* (2006.01)
*H02M 1/00* (2006.01)

(52) U.S. Cl.
CPC .......... *H02M 3/33507* (2013.01); *H02M 2001/0032* (2013.01); *H02M 2001/0054* (2013.01); *Y02B 70/1491* (2013.01); *Y02B 70/16* (2013.01)

(58) Field of Classification Search
CPC ..... H02M 3/33507; H02M 2001/0032; H02M 2001/0054
USPC ...................................................... 363/21.12
See application file for complete search history.

(56) References Cited

U.S. PATENT DOCUMENTS

| 5,627,459 A * | 5/1997 | Itoyama ................. G05F 1/565 323/283 |
| 8,115,465 B2 | 2/2012 | Park et al. |
| 8,213,193 B2 | 7/2012 | Ye |
| 8,624,571 B2 * | 1/2014 | da Silva ................ H02M 3/156 323/283 |
| 2008/0123372 A1 | 5/2008 | Yang |
| 2010/0208500 A1 * | 8/2010 | Yan .................... H02M 3/33523 363/21.12 |
| 2013/0128639 A1 * | 5/2013 | Ettes ..................... H02M 7/217 363/126 |

OTHER PUBLICATIONS

Green-Mode Flyback Controller; UCC28610; SLUS888F—Jan. 2009—Revised Sep. 2012; pp. 1, 2, 12, 22, 32; Texas Instruments Incorporated; Dallas, Texas.
Constant-Voltage, Constant-Current Controller With Primary-Side Regulation; UCC28700, UCC28701, UCC28702, UCC28703; SLUSB41—Jul. 2012; pp. 1, 6, 13, 14, 18; Texas Instruments Incorporated; Dallas, Texas.

* cited by examiner

*Primary Examiner* — Kyle J Moody
*Assistant Examiner* — Afework Demisse
(74) *Attorney, Agent, or Firm* — William B. Kempler; Charles A. Brill; Frank D. Cimino

(57) ABSTRACT

An electronic device includes a power stage, a switch and a controller. Power is transferred from an input through the power stage to an output. The switch turns on and off a current provided to the power stage for transferring the power. The controller turns on and off the switch. During a low-load mode, the controller causes the switch to operate with a constant on-time control.

16 Claims, 3 Drawing Sheets ent invention.

CONSTANT ON-TIME CONTROL FOR POWER CONVERTER

BACKGROUND OF THE INVENTION

Voltage or power regulators or converters are used in a variety of electronic circuits and can have a variety of different designs or architectures. A typical application for a power converter is to provide a variable electrical current at a relatively constant voltage level for normal operation of the electronic circuit.

There are times when a typical power converter must operate at a very low power level, i.e. in a standby mode, a low-load mode or a no-load mode. For example, when a cell phone is unplugged from its charger, the power converter in the charger enters the standby mode, in which it draws very little power. The charger continues to draw some minimum amount of power in order to maintain output voltage regulation and to be able to detect when the cell phone is plugged back into the charger. Upon detecting the cell phone, the power converter of the charger ramps up to a "normal" mode, in which it operates at a high, or normal, power level.

Many power converters may spend most of the time in the low-load, or standby, mode, e.g. when a charger (incorporating the power converter) is left plugged in to an AC wall outlet after a cell phone has been unplugged from the charger. However, the power used during this time is generally wasted. It is very important, therefore, for such power converters to draw as little power as possible during this time in order to minimize power wastage and maximize efficiency.

It is with respect to these and other background considerations that the present invention has evolved.

SUMMARY OF THE INVENTION

According to some embodiments, the present invention generally involves an electronic device that has an input, a power stage, a switch and a controller. Power is received at the input. The power is transferred through the power stage to an output. The switch turns on and off a current provided to the power stage for transferring the power. The controller turns on and off the switch. During a low-load mode, the controller causes the switch to operate with a constant on-time control.

According to some embodiments, the present invention involves a method within an electronic device. The method generally includes determining whether a low-load condition exists; and upon determining that the low-load condition exists, maintaining a constant on-time control of a switch that controls a current through a power stage for generating an output power therefrom for powering a load.

A more complete appreciation of the present disclosure and its scope, and the manner in which it achieves the improvements described herein, can be obtained by reference to the following detailed description of presently preferred embodiments taken in connection with the accompanying drawings, which are briefly summarized below, and the appended claims.

DETAILED DESCRIPTION OF THE INVENTION

Figure 1:
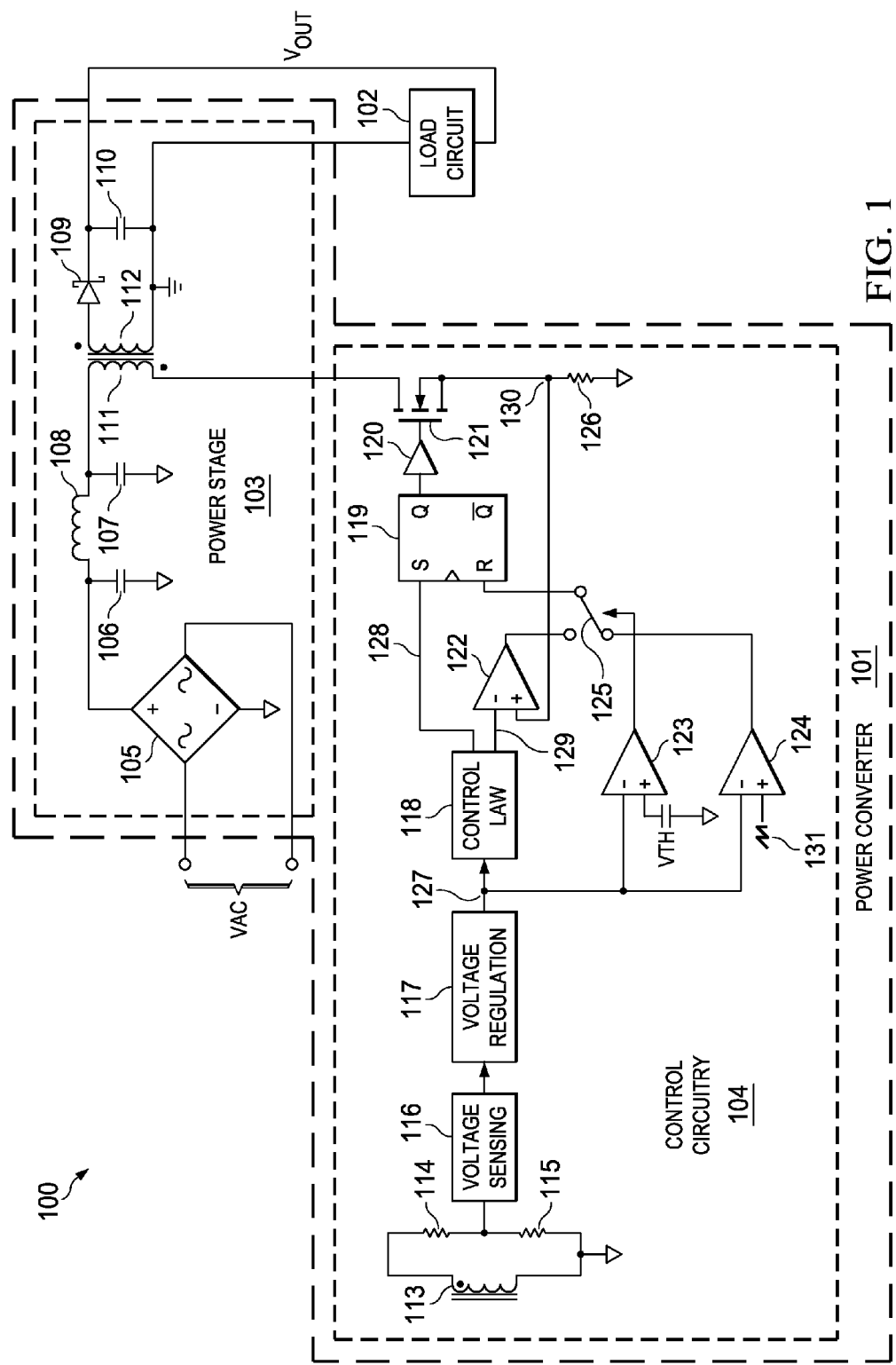
FIG. 1 is a simplified schematic diagram of an example electronic circuit incorporating an embodiment of the present invention.

An electronic circuit 100 that includes a power converter 101 incorporating an embodiment of the present invention is shown in FIG. 1. The power converter 101 generally operates under peak current control during a normal operation mode and under constant on-time control during a standby mode. The constant on-time control enables greater loss reduction during the standby mode than is achieved with conventional standby mode control techniques, as described below.

In addition to the power converter 101, the electronic circuit 100 is illustrated as including a load circuit 102. The load circuit 102 generally represents any appropriate type of circuitry for which the power converter 101 can be used to supply power. For example, the load circuit 102 may be the conventional components of a phone (e.g. cell, cordless, landline), a computer (e.g. desktop, notebook, handheld), a household/office appliance, a clock, a radio, an audio and/or video player, a game console or any other appropriate type of electronic device. In some embodiments, the load circuit 102 may be detachable from the power converter 101, e.g. as a cell phone can be unplugged from a charger that incorporates the power converter 101.

The power converter 101 is illustrated as a flyback converter. Flyback converters are used in both AC/DC and DC/DC conversion with galvanic isolation between the input and any outputs. A flyback converter is generally a type of buck-boost converter with a transformer, so that the output voltage can be multiplied over the input voltage with an additional advantage of isolation between the primary and secondary sides of the transformer. However, the power converter 101 (with appropriate modifications, if any) may alternatively be any appropriate type of power converter that can use the control technique described herein.

In the illustrated embodiment, the power converter 101 generally includes a power stage 103 and a control circuitry 104. Under control of the control circuitry 104, the power stage 103 generally converts an input voltage (e.g. VAC) into an output voltage Vout. The output voltage Vout is generally provided to power the load circuit 102. Although the power converter 101 is shown as converting an AC input to a DC output, in other embodiments the power converter 101 (with appropriate modifications, if any) may also be used in a DC/DC conversion design.

The power stage 103 further generally includes a rectifier bridge 105, a filter (e.g. a CLC filter comprising capacitors 106 and 107 and an inductor 108), a diode 109, an output capacitor 110 and a flyback transformer (e.g. having a primary winding 111, a secondary winding 112 and an auxiliary winding 113). (The auxiliary winding 113, however, may be considered as part of the control circuitry 104.) The transformer (111, 112 and 113) is illustrated as a flyback transformer, as indicated by two dots at different ends of the windings 111 and 112, which indicate that the polarity is different for each side. The control circuitry 104 further generally includes a voltage divider (e.g. resistors 114 and 115), a voltage sensing unit 116, a voltage regulation unit 117, a control law unit 118, an S-R flip flop 119, a signal driver 120, a FET 121, comparators 122, 123 and 124, a switch 125 and a resistor 126.

The power converter 101 and the overall electronic circuit 100 may also include other components that have not been shown for the sake of simplicity. Additionally, other components and/or configurations of components may be used for generally the same or similar functions or purposes as those of the illustrated components. Thus, the exact components and configuration of components shown in FIG. 1 are for illustrative and explanatory purposes only and not intended to limit the scope of the present invention, except where expressly stated in the claims if at all.

In some embodiments, the input voltage VAC is provided by a conventional AC electrical wall outlet. Within the power stage 103, therefore, the rectifier bridge 105 converts the AC input voltage VAC into a rough DC voltage, which is smoothed out by the filter 106, 107 and 108. The DC voltage thus produced is provided to the primary winding 111 of the transformer 111, 112 and 113, as well as to the FET 121 and resistor 126. Under control of the control circuitry 104, the power converter 101 switches on and off the current through the primary winding 111 of the transformer 111, 112 and 113. With each on-off switching cycle of this current, power is transferred through to the secondary side (i.e. through the secondary winding 112) of the transformer 111, 112 and 113, where it is typically rectified (e.g. by the diode 109) and filtered (e.g. by the output capacitor 110) to produce a DC output voltage (e.g. at Vout).

The level of the power thus transferred generally depends on the frequency at which the current is switched on and off and the peak level of the current. The switching frequency generally indicates how often power is transferred to the output, and the peak current generally indicates how much power is transferred each time. Therefore, these two parameters (switching frequency and peak current) are typically used to control a flyback converter, as they are in the illustrated embodiment during normal operation mode, as described below.

Within the control circuitry 104, the voltage produced by the auxiliary winding 113 is generally indicative of the output voltage Vout. In the illustrated embodiment, therefore, using primary side regulation the voltage on the auxiliary winding 113 is sensed by the voltage sensing unit 116 through the voltage divider 114 and 115 during the transfer of transformer energy to the secondary winding 112. In some embodiments, this primary side sensing is used to determine a secondary side on-time.

Figure 2:
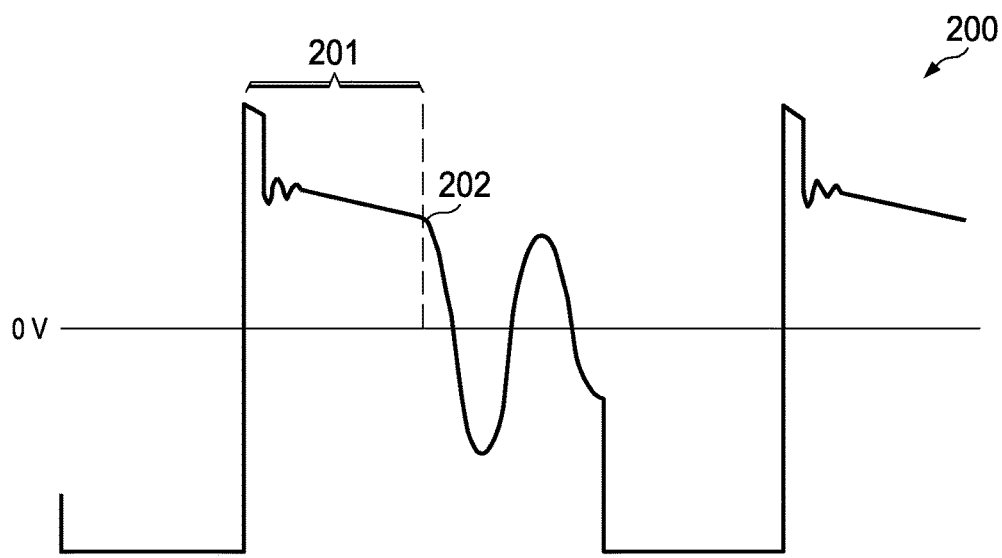
FIG. 2 is a simplified graph of a waveform within a component of the example electronic circuit shown in FIG. 1 in accordance with an embodiment of the present invention.

A typical voltage waveform 200 for the voltage on the auxiliary winding 113 is shown in FIG. 2. The waveform 200 generally shows a down slope region 201 representing a decreasing total rectifier and resistance voltage drop as the current through the secondary winding 112 (FIG. 1) decreases to zero. The voltage on the auxiliary winding 113 is generally sampled by the voltage sensing unit 116 (e.g. using signal discrimination methods to ensure an accurate sample of the voltage) at the end of the demagnetization time point 202 of the current through the secondary winding 112 in order to provide a fairly accurate representation of the output voltage Vout, including the secondary side on-time. In some embodiments, the voltage sensing unit 116 may achieve an accurate representation of the voltage on the auxiliary winding 113 by blocking leakage inductance reset and ringing, continuously sampling the auxiliary voltage during the down slope region 201 after the ringing is diminished, and capturing the error signal at the time the current through the secondary winding 112 reaches zero. The waveform 200 may also be used in some embodiments to determine timing information to achieve valley-switching and to control the duty cycle of the current through the secondary winding 112.

In the illustrated embodiment, the voltage sensing unit 116 produces a signal that is regulated as needed by the voltage regulation unit 117 to produce a control voltage at node 127 that is indicative of the level of the output voltage Vout. The control voltage at 127 is thus a control parameter of a voltage feedback loop for controlling the output power. (Alternatively, in other embodiments other types of control techniques may be used, e.g. using a secondary side opto coupler feedback.) The control voltage at 127 is provided to the control law unit 118 and the comparators 123 and 124.

In the illustrated embodiment, the comparator 123 compares the control voltage at 127 to a threshold voltage Vth. When the control voltage at 127 is above the threshold voltage Vth, the power converter 101 is considered to be in a normal operating mode. When the control voltage at 127 is below the threshold voltage Vth, the power converter 101 is considered to be in a standby (i.e. low-load or no-load) operating mode. The output of the comparator 123, therefore, is generally indicative of whether the power converter 101 is in the normal or standby operating mode. The power converter 101 is generally considered to be in the normal operating mode when the load circuit 102 is performing any conventional tasks of such devices or when the load circuit 102 includes a battery that needs to be recharged or when the load circuit 102 otherwise requires significant power from the power converter 101. The power converter 101 generally enters the standby mode when the load circuit 102 is turned off, enters a period of very low activity, is disconnected from the power converter 101 or otherwise does not require significant power from the power converter 101.

In the illustrated embodiment, the control law unit 118 produces a switching frequency signal on line 128 and a peak current signal on line 129 in response to the voltage level of the control voltage at 127. With these two signals, the control law unit 118 generally controls the power output of the power converter 101 during the normal operating mode using peak current control techniques. During the standby mode, on the other hand, only the switching frequency signal on 128 is used, as described below.

The switching frequency signal on 128 or the peak current signal on 129 or both are control parameters generally used to control the level of the output voltage Vout. For example, the switching frequency signal on 128 is generally an oscillating voltage with a frequency that is increased when the control voltage at 127 indicates that the output voltage Vout has decreased, e.g. due to an increase in the activity of the load circuit 102 pulling the voltage down. Conversely, the control law unit 118 decreases the frequency of the switching frequency signal on 128 when the control voltage at 127 indicates that the output voltage Vout has increased.

The switching frequency signal on 128 is provided to the set S input of the S-R flip flop 119. The S-R flip flop 119, therefore, is set to provide a positive or high output with a frequency in accordance with that of the switching frequency signal on 128.

The peak current signal on 129 is generally a current threshold voltage that is increased by the control law unit 118 when the control voltage at 127 indicates that the output voltage Vout has decreased, e.g. due to an increase in the activity of the load circuit 102 pulling the voltage down. Conversely, the control law unit 118 decreases the voltage of the peak current signal on 129 when the control voltage at 127 indicates that the output voltage Vout has increased.

The peak current signal on 129 is provided to the negative input of the comparator 122. A voltage at node 130 is provided to the positive input of the comparator 122. The voltage at 130 is generally indicative of the current through the primary winding 111 of the transformer 111, 112 and 113 as it is applied also to the resistor 126 (a current sense resistor) after passing through the FET 121. The output of the comparator 122, therefore, generally indicates whether this current has reached the level of the peak current signal on 129 (a peak current threshold).

When the power converter 101 is in the normal operating mode, the control voltage at 127 is above the threshold voltage Vth, so the comparator 123 produces an output that causes the switch 125 to select the output of the comparator 122 to be passed through to the reset R input of the S-R flip flop 119. In other words, whereas the switching frequency signal on 128 sets the S-R flip flop 119 to a high output, the output of the comparator 122 resets the S-R flip flop 119 to a low output. In this manner, the S-R flip flop 119 is generally turned on (high output) with a frequency that depends on the switching frequency signal on 128 and remains on for a duration that depends on the peak current signal on 129.

The output of the S-R flip flop 119 (after passing through the signal driver 120) controls the FET 121, i.e. a power switch, which controls the power flow through the power converter 101. When the S-R flip flop 119 produces a high output, the FET 121 is turned on so that current can flow through the primary winding 111 to store energy in the transformer 111, 112 and 113. When the S-R flip flop 119 produces a low output, the FET 121 is turned off and the stored energy is transferred to the secondary side to supply the load circuit 102. In this manner, the FET 121 is generally turned on with a frequency that depends on the switching frequency signal on 128 and remains on for a duration that depends on the peak current signal on 129. The components 113-120 and 122-126, therefore, serve as a controller to turn on and off the FET 121.

The amount of power transferred to the secondary side of the transformer 111, 112 and 113 can generally be increased by increasing the frequency of the switching frequency signal on 128 and/or increasing the level of the peak current signal on 129. Conversely, the amount of power transferred to the secondary side of the transformer 111, 112 and 113 can generally be decreased by decreasing the frequency of the switching frequency signal on 128 and/or decreasing the level of the peak current signal on 129. In the normal operating mode, therefore, the control law unit 118 adjusts the switching frequency signal on 128 and/or the peak current signal on 129 in order to control the transfer of power through the power converter 101 in response to changes in the control voltage at 127 due to changes in the current drawn by the load circuit 102. In this way, during the normal operating mode, the power converter 101 generally produces the output voltage Vout at a relatively constant voltage level while increasing or decreasing the current as needed depending on the activity of the load circuit 102.

As the level of power drawn by the load circuit 102 decreases, the frequency of the switching frequency signal on 128 and/or the level of the peak current signal on 129 generally also decrease. In the standby mode, it is generally desirable to make these parameters as low as practical, since the general purpose of the standby mode is for the power converter 101 to consume as little power as possible (while remaining capable of returning to the normal operating mode quickly and smoothly when needed). However, there is a practical limit to decreasing these parameters.

In general, to minimize power consumption during the standby mode, the switching frequency signal on 128 and the level of the peak current signal on 129 are both brought to a minimum level. In other words, the transfer of power through the transformer is done as infrequently as possible while transferring as little power as possible each time.

The illustrated embodiment, however, uses a primary side regulation technique, which has a transient response issue. The transient response issue arises because the output voltage Vout can be known by primary side regulation only when the power converter 101 is actively switching. When not switching, the output voltage Vout is not known. Therefore, if the power converter 101 is switching very infrequently and something happens between two switching cycles (e.g. the load circuit 102 is plugged back into the power converter 101 or otherwise suddenly ramps up the load level), then the output voltage Vout could be unknown for a relatively long period of time. In this case, the power converter 101 may not respond as quickly as may be needed, potentially causing the load circuit 102 to malfunction. Additionally, if the frequency is allowed to drop very low, then the output capacitor 110 must be relatively large to compensate for the load transient, which is undesirable in many small electronic devices in which physical space is at a premium. The size of the output capacitor 110 may thus be a limiting factor for how low the switching frequency may drop.

To maintain a good transient response, therefore, it is desirable to have the switching as frequent as possible, i.e. the frequency of the switching frequency signal on 128 as high as possible. In this case, a transient in the load circuit 102 can be detected as quickly as possible, and the power converter 101 can respond as needed.

As noted above, however, a lower (not higher) frequency for the switching frequency signal on 128 is needed for low power consumption during the standby mode. Therefore, it is desirable to have a minimum frequency below which the switching frequency signal on 128 does not go, so that the frequency may be relatively low, but not too low. (Additionally, a smaller output capacitor 110 may be used if the frequency is not too low.)

Since the frequency of the switching frequency signal on 128 is not allowed to go too low, it is desirable to ensure that the level of the peak current signal on 129 is as low as possible in order to minimize power transfer during each switching cycle, thereby maximizing power conservation during the standby mode. However, if the level of the peak current signal on 129 is very low, then the secondary side conduction time is very short. In this case, if the secondary side conduction time is too short, then there is not enough time to sense the output voltage Vout through the auxiliary winding 113 at the voltage sensing unit 116. Additionally, with a relatively low level of the peak current signal on 129, noise or ringing becomes a problem for the current sensing resistor 126 and the comparator 122. It is desirable, therefore, to maintain the level of the peak current signal on 129 sufficiently high to cause enough current to flow to ensure that the secondary side conduction time is long enough and the noise/signal ratio is low enough for reliable sensing at the voltage sensing unit 116.

As noted above, however, a lower (not higher) level of the peak current signal on 129 is needed for low power consumption during the standby mode. Therefore, it is desirable to have a minimum level below which the peak current signal on 129 does not go, so that the peak current level may be relatively low, but not too low.

In the illustrated embodiment, when the power converter 101 encounters a very low-load or no-load from the load circuit 102 (i.e. begins to enter the standby mode), the control law unit 118 reduces the frequency of the switching frequency signal on 128 and the voltage level of the peak current signal on 129 to their minimum desirable values. In some embodiments, the control circuitry 104 also reduces the on-time of the FET 121 upon encountering the low-load condition. In some embodiments, the control circuitry 104 monitors the secondary side on-time or conduction time through the auxiliary winding 113 and reduces an on-time of the switch until the secondary side on-time reaches a minimum. Additionally, when the power converter 101 enters the standby mode, the control voltage at 127 is allowed to drop below the ordinary level used for controlling the output voltage Vout during the normal operating mode. In some embodiments, when the frequency of the switching frequency signal on 128 drops down to or below a threshold value, the decrease of this frequency is halted and the decrease in the control voltage at 127 is enabled.

In some embodiments, the control voltage at 127 is made as low as possible. In particular, the control voltage at 127 may drop below the threshold voltage Vth. In this case, the comparator 123 produces an output that causes the switch 125 to select the output of the comparator 124 to be passed through to the reset R input of the S-R flip flop 119. In other words, whereas the switching frequency signal on 128 continues to set the S-R flip flop 119 to a high output as described above, the output of the comparator 124 resets the S-R flip flop 119 to a low output. In this manner, the S-R flip flop 119 is generally turned on (high output) with a frequency that depends on the switching frequency signal on 128 and remains on for a duration that depends on the inputs to the comparator 124.

In the illustrated embodiment, the comparator 124 receives the control voltage at 127 at a positive input and an oscillating sawtooth reference voltage 131 at a negative input. The frequency of the sawtooth reference voltage 131 generally matches that of the switching frequency signal on 128. The output of the comparator 124 generally determines the conduction time of the FET 121. The comparator 124 is controlled by the voltage level of the control voltage at 127. In particular, when the control voltage at 127 is below the level of the sawtooth reference voltage 131, the comparator 124 produces a high output, which resets the S-R flip flop 119 to a low output, which turns off the FET 121. On the other hand, when the control voltage at 127 is below the level of the sawtooth reference voltage 131, the comparator 124 produces a low output, which allows the switching frequency signal on 128 to set the S-R flip flop 119 to a high output, which turns on the FET 121.

Due to the sawtooth shape of the sawtooth reference voltage 131, when the control voltage at 127 increases, the amount of time that the control voltage at 127 is above the level of the sawtooth reference voltage 131 increases, so the amount of time that the S-R flip flop 119 is held in set and the amount of time that the FET 121 is held turned on both increase. On the other hand, when the control voltage at 127 decreases, the amount of time that the control voltage at 127 is above the level of the sawtooth reference voltage 131 decreases, so the amount of time that the S-R flip flop 119 is held in set and the amount of time that the FET 121 is held turned on both decrease.

In other words, in the standby mode, when the output voltage Vout increases slightly, the feedback control loop decreases the level of the feedback control voltage at 127, which increases the amount of time that the comparator 124 produces a high output, which decreases the amount of time that the S-R flip flop 119 is held in set, which decreases the amount of time that the FET 121 can be turned on, which decreases the amount of power that can be transferred to the secondary side of the transformer 111, 112 and 113, thereby decreasing the output voltage Vout. On the other hand, when the output voltage Vout decreases slightly, the feedback control loop increases the level of the control voltage at 127, which decreases the amount of time that the comparator 124 produces a high output, which increases the amount of time that the S-R flip flop 119 is held in set, which increases the amount of time that the FET 121 can be turned on, which increases the amount of power that can be transferred to the secondary side of the transformer 111, 112 and 113, thereby increasing the output voltage Vout.

In this manner, slight fluctuations in the output voltage Vout are corrected, and the power converter 101 reaches a fairly stable state in which the on-time, or duty cycle, of the FET 121 is held relatively constant. In other words, after the power converter 101 reduces the frequency of the switching frequency signal on 128 and the voltage level of the peak current signal on 129 to their minimum values, as described above, the power converter 101 changes to this constant on-time control technique for the standby mode. In some embodiments, the control circuitry 104 operates the FET 121 with the constant on-time control utilizing primary side sensing to determine a value that is indicative of a secondary side on-time, as described above. Additionally, when the feedback sensing components 113-117 detect a significant drop in the output voltage Vout (indicating increased activity of the load circuit 102) the power converter 101 quickly exits the low-load constant on-time control mode and resumes the normal operation described above.

The illustrated embodiment is shown using the comparator 124 to generate the relatively constant on-time for the FET 121. Alternatively, in other embodiments any appropriate components or circuitry may be used to generate the relatively constant on-time. The specific components shown, on the other hand, are for illustrative and explanatory purposes only.

In some embodiments, the sawtooth reference voltage 131 is generated in a manner that ensures its frequency is about the same as that of the switching frequency signal on 128, i.e. both are fixed at about the same value. In some embodiments, the sawtooth reference voltage 131 is based on or generated from the switching frequency signal on 128. In this manner, the setting and resetting of the S-R flip flop 119 are coordinated to ensure that the on-time is relatively constant. Additionally, in some embodiments, the reduction of the control voltage at 127 in the standby mode enables a more reliable adjustment of the on-time. Furthermore, although the reference voltage 131 is depicted and described as being a sawtooth waveform, in other embodiments the reference voltage 131 may be any appropriate waveform (e.g. a ramp waveform, a sine wave, etc.) that is capable of providing the desired timing control.

Figure 3:
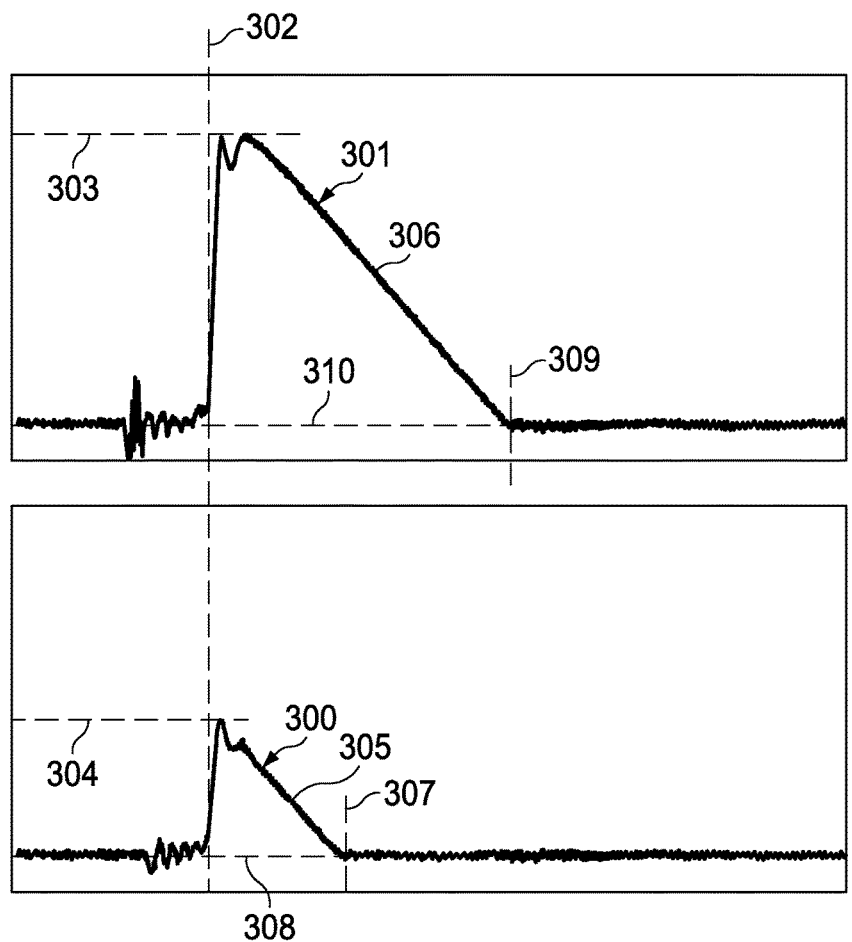
FIG. 3 is simplified graphs illustrating performances of an example simulated circuit incorporating an embodiment of the present invention and an example simulated prior art circuit.

Graphs 300 and 301 illustrate the difference between the performances of an example simulated circuit incorporating an embodiment of the present invention (graph 300) and an example simulated prior art circuit (graph 301), as shown in FIG. 3. The example simulated circuits included almost identical power stages (e.g. similar to power stage 103, FIG. 1). However, the example simulated circuit incorporating an embodiment of the present invention included a constant on-time generator for controlling the power transfer during a low-power condition. Whereas, the example simulated prior art circuit included only a peak current control technique under a similar condition.

The graphs 300 and 301 are drawn to approximately the same scale and show the current response over time of the outputs of the example simulated circuits. The voltage outputs and power transfer cycle times were set to be approximately the same. Dashed line 302 represents the approximate starting time point for a power transfer cycle during the standby mode in both simulations.

As can be seen, the level (indicated by dashed line 303) to which the simulated prior art current response graph 301 rises is much higher than the level (indicated by dashed line 304) to which the simulated current response graph 300 for the embodiment of the present invention rises. As a result, since current dissipation segments 305 and 306 of both graphs 300 and 301, respectively, have approximately the same slope, the time (dashed line 307) at which the simulated current response graph 300 for the embodiment of the present invention returns to its baseline (dashed line 308) is significantly earlier than the time (dashed line 309) at which the simulated prior art current response graph 301 returns to its baseline (dashed line 310).

The areas under the graphs 300 and 301 (between the graphs 300 and 301 and their baselines 308 and 310, respectively) are indicative of the amount of power transferred through the example simulated circuits. As can be seen, therefore, the amount of power transferred in a cycle of the example simulated circuit incorporating an embodiment of the present invention (graph 300) is significantly less than the amount of power transferred in a similar cycle of the example simulated prior art circuit (graph 301). In this manner, the constant on-time control of the FET 121 (FIG. 1) enables greater efficiency during the standby mode than is achieved with conventional standby mode control techniques.

Figure 4:
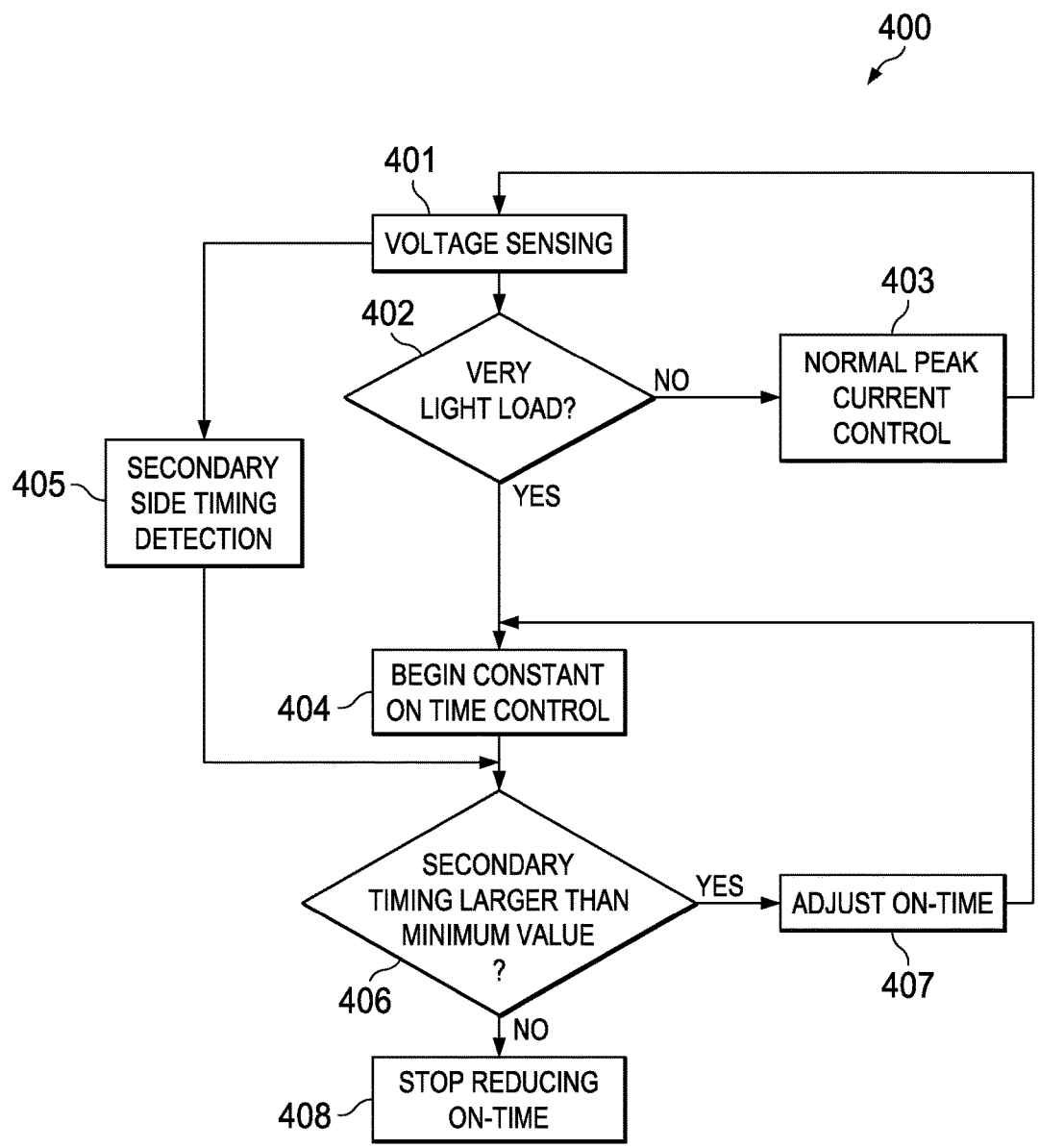
FIG. 4 is a simplified functional block diagram illustrating a control sequence for the example electronic circuit shown in FIG. 1 in accordance with an embodiment of the present invention.

A simplified functional block diagram 400 illustrating an example method for controlling the power converter 101 (FIG. 1) in accordance with an embodiment of the present invention is shown in FIG. 4. Additionally, other control techniques or sequences may also be used with the same, similar or different components as those described above and shown in FIG. 1.

In the illustrated embodiment, the functional diagram 400 includes a voltage sensing function 401 generally performed by the components 113-117. From the sensed voltage, the components 113-117 determine (at 402) whether the electronic circuit 100 is currently in a low-load, no-load or very light load condition. If not, then the voltage regulation unit 117 generates the control voltage at 127 at a level that causes the comparator 123 to generate the output that causes the switch 125 to select the output of the comparator 122, as described above. In this case, the switching frequency signal on 128 and the peak current signal on 129 control the S-R flip flop 119 to operate the FET 121 in the normal operating mode using the normal peak current control (at 403), as described above. The components 113-117 generally maintain the peak current control (i.e. repeat 401-403) as long as the electronic circuit 100 is not in a low-load, no-load or very light load condition as determined at 402.

On the other hand, if the components 113-117 determine (at 402) that the electronic circuit 100 is currently in a low-load, no-load or very light load condition, then the power converter 101 begins to change over (at 404) to the constant on-time control technique, as described above. In particular, the voltage regulation unit 117 generates the control voltage at 127 at a level that causes the comparator 123 to generate the output that causes the switch 125 to select the output of the comparator 124, as described above. In this case, the switching frequency signal on 128 and the output of the comparator 124 (dependent on the control voltage at 127 and the sawtooth reference voltage 131) control the S-R flip flop 119 to operate the FET 121 in the standby mode using the constant on-time control technique, as described above.

The voltage sensing function 401 of the components 113-117 generally further enables detection (at 405) of the timing of the secondary side of the transformer 111, 112 and 113. Therefore, when the power converter 101 begins to change over (at 404) to the constant on-time control technique, the components 113-117 determine (at 406) whether the secondary timing is larger than a minimum value, as described above. If so, then the components 113-117 adjust (at 407) the level of the control voltage at 127 in order to adjust the on-time of the FET 121. The components 113-117 generally repeat (404-407) this adjustment until the secondary timing is no longer larger than the minimum value as determined at 406. Then the components 113-117 stop (at 408) reducing the on-time and maintain the generally constant on-time control.

Presently preferred embodiments of the present invention and its improvements have been described with a degree of particularity. This description has been made by way of preferred example. It should be understood, however, that the scope of the claimed subject matter is defined by the following claims, and should not be unnecessarily limited by the detailed description of the preferred embodiments set forth above.

The invention claimed is:
1. An electronic device comprising:
an input at which power is received;
a power stage through which the power is transferred to an output;
a switch that turns on and off a current provided to the power stage for transferring the power; and
a controller connected to the switch to turn on and off the switch;
and wherein:
during a low-load mode, the controller causes the switch to operate with a constant on-time control; and
when not in the low-load mode, the controller causes the switch to operate with peak current control, wherein:
the power stage further comprises a transformer having a primary side and a secondary side; and
during the low-load mode, the controller causes the switch to operate with the constant on-time control utilizing primary side sensing using an auxiliary winding signal to determine a secondary side on-time.
2. The electronic device of claim 1, wherein:
upon entering the low-load mode, the controller reduces an on-time of the switch, after which the controller changes to the constant on-time control.
3. The electronic device of claim 1, wherein:
upon entering the low-load mode, the controller monitors a secondary side on-time and reduces an on-time of the switch until the secondary side on-time reaches a minimum, at which point the controller causes the switch to operate with the constant on-time control.

4. The electronic device of claim 1, wherein:
upon entering the low-load mode, the controller reduces a frequency of the switch until the frequency is at about a minimum value, then the controller changes to the constant on-time control.

5. The electronic device of claim 1, wherein:
during the low-load mode, the controller compares a feedback control voltage with an oscillating reference voltage having a fixed frequency to determine the on-time for the switch.

6. A method comprising:
in an electronic device, determining whether a low-load condition exists;
upon determining that the low-load condition exists, maintaining a constant on-time control utilizing primary side sensing with an auxiliary winding signal to operate a switch that controls a current through a power stage for generating an output power therefrom for powering a load; and
upon determining that the low-load condition does not exist, maintaining a peak current control.

7. The method of claim 6, further comprising:
upon determining that the low-load condition exists, reducing an on-time of the switch, and then maintaining the constant on-time control.

8. The method of claim 6, further comprising:
upon determining that the low-load condition exists, determining whether a secondary side timing is greater than a minimum value;
upon determining that the secondary side timing is greater than the minimum value, reducing the on-time of the switch; and
upon determining that the secondary side timing is not greater than the minimum value, maintaining the constant on-time control.

9. The method of claim 6, further comprising:
upon determining that the low-load condition exists, reducing a frequency of the switch until the frequency is at about a minimum value, and then maintaining the constant on-time control.

10. The method of claim 6, wherein:
the power stage further comprises a transformer having a primary side and a secondary side; and
the method further comprises, determining whether the low-load condition exists by sensing a primary side value indicative of a secondary side on-time.

11. The method of claim 6, further comprising:
upon determining that the low-load condition exists, comparing a feedback control voltage with an oscillating reference voltage having a fixed frequency to set the on-time for the switch.

12. An electronic device comprising:
an input at which an input power is received;
a power converting means for converting the input power to an output power; and
a current control means for turning on and off a current provided to the power converting means, the current being used to convert the input power to the output power; and wherein:
upon entering a low-load mode, the current control means monitors an on-time of a secondary side of the power converting means utilizing a primary side signal from an auxiliary winding and reduces an on-time of the current until the secondary side on-time reaches a minimum, and then operates with a constant on-time control; and
when not in the low-load mode, the current control means operates with peak current control.

13. The electronic device of claim 12, wherein:
the power converting means further comprises a transformer having a primary side and the secondary side;
the current control means further comprises a transistor switch and a controller; and
the controller turns on and off the transistor switch to control the current and the conversion of power from the primary side to the secondary side.

14. The electronic device of claim 12, wherein:
upon entering the low-load mode, the current control means reduces a frequency of the current until the frequency is at about a minimum value, then the current control means changes to the constant on-time control.

15. The electronic device of claim 12, wherein:
the power converting means further comprises a transformer having a primary side and a secondary side; and
during the low-load mode, the current control means operates with the constant on-time control utilizing primary side sensing to determine a secondary side on-time.

16. The electronic device of claim 12, wherein:
during the low-load mode, the current control means compares a feedback control voltage with an oscillating reference voltage having a fixed frequency to determine the on-time for the current.

\* \* \* \* \*